United States Patent
Pezeshki

(10) Patent No.: US 6,591,038 B1
(45) Date of Patent: Jul. 8, 2003

(54) OPTICAL INTERLEAVER AND DEMULTIPLEXING APPARATUS FOR WAVELENGTH DIVISION MULTIPLEXED OPTICAL COMMUNICATIONS

(75) Inventor: Bardia Pezeshki, Redwood City, CA (US)

(73) Assignee: JDS Uniphase Corporation, San Jose, CA (US)

(*) Notice: Subject to any disclaimer, the term of this patent is extended or adjusted under 35 U.S.C. 154(b) by 0 days.

(21) Appl. No.: 09/825,182

(22) Filed: Apr. 3, 2001

(51) Int. Cl.$^7$ ................................................ G02B 6/34
(52) U.S. Cl. ............................................... 385/37; 385/24
(58) Field of Search ........................... 385/15, 24, 37; 359/127, 130

(56) References Cited

U.S. PATENT DOCUMENTS

| | | | |
|---|---|---|---|
| 4,993,796 A | | 2/1991 | Kapany et al. |
| 5,107,359 A | * | 4/1992 | Ohuchida ............... 359/124 |
| 6,040,932 A | * | 3/2000 | Duck et al. ............. 359/124 |
| 6,317,539 B1 | * | 11/2001 | Loh et al. ............... 385/37 |
| 6,363,184 B2 | * | 3/2002 | Cao ........................ 385/24 |
| 6,388,783 B1 | * | 5/2002 | Weller-Brophy ........ 359/127 |

FOREIGN PATENT DOCUMENTS

| | | |
|---|---|---|
| EP | 0 810 454 A1 | 12/1997 |
| EP | 0 921 420 A1 | 6/1999 |
| EP | 1 009 112 A2 | 6/2000 |
| EP | 1 030 480 A2 | 8/2000 |
| WO | WO 99/08143 A1 | 2/1999 |
| WO | WO 00/76104 A1 | 12/2000 |
| WO | WO 01/06279 A1 | 1/2001 |

* cited by examiner

*Primary Examiner*—Akm E. Ullah
*Assistant Examiner*—Jerry T Rahll
(74) *Attorney, Agent, or Firm*—Kudirka & Jobse, LLP

(57) ABSTRACT

A demultiplexing apparatus for wavelength division multiplexed optical communications makes use of an interleaver to separate alternating wavelengths into separate wavelength groups. These separate wavelength groups may then be demultiplexed using conventional demultiplexers. An optical coupler such as an optical circulator or a curved grating is used to direct the reflected wavelengths to a separate output path. The interleaver preferably has a square wave reflectivity response in the wavelength domain, and reflects every other wavelength to a separate output path than those wavelengths that are transmitted past the interleaver. The interleaver may be a diffraction grating that may be apodized or chirped. The grating may also be a sampled grating structure. Alternatively, the interleaver may be a planar waveguide that has a periodic change in the refractive index conditions of a section of the waveguide.

22 Claims, 5 Drawing Sheets

OPTICAL INTERLEAVER AND DEMULTIPLEXING APPARATUS FOR WAVELENGTH DIVISION MULTIPLEXED OPTICAL COMMUNICATIONS

FIELD OF THE INVENTION

This invention relates to optical communications and, more specifically, to the handling of multiple optical communications channels in a wavelength division multiplexed communications system.

DESCRIPTION OF THE RELATED ART

Many optical communications systems use wavelength division multiplexing to break up the bandwidth of a communications path into multiple channels. In recent years, such systems have been using narrower and narrower channel spacings. As a result, however, it is becoming more difficult to demultiplex channels with adequate isolation and low loss. For example, as the channel spacings decrease, the cross talk between adjacent channels tends to increase. As a result, demultiplexers with relatively narrow spacing are desirable, but difficult to fabricate.

An alternative to using a single narrow bandwidth demultiplexer to separate all the channels simultaneously is to use a two-step approach. In a first stage, a device is used to separate the channels into two groups, each group consisting of every other channel. That is, the channels are separated into "odd" and "even" channels. Two coarse multiplexers are then used to demultiplex the separated channels. In the past, the first stage devices that do the initial separation have been referred to as "spectral slicers" or "interleavers." Although fiber Bragg gratings provide excellent reflective properties for narrow channels, they have not been readily used as interleavers for demultiplexing many wavelengths. The reason is that a separate grating would be required for each channel. Moreover, to provide the necessary separation of odd and even channels, an optical circulator would have to be used with each grating. Optical circulators are relatively complex devices, and add greatly to the cost of a system.

Another limitation of conventional fiber Bragg gratings when it comes to their use in interleavers is the fact that the refractive index difference between different segments of the grating tends to be relatively low. This is due to the use of ultraviolet light exposure to fabricate the grating. By laterally exposing the core of the fiber to a periodic pattern of intense ultraviolet light, a permanent change in the refractive index of the fiber's core is produced, creating a fixed index modulation according to the exposure pattern. However, this manner of forming the grating does not produce a particularly high refractive index contrast. A grating operates as a basic reflector stack, and the spectral width of such a reflector stack is proportional to the index contrast available, for a given reflectivity. This is because the spectral width is inversely proportional to the penetration depth of the light, and the higher the index contrast, the smaller the penetration. The bandwidth can be increased slightly by chirping the grating. However, if the chirp is too great, internal modes begin to appear within the grating.

When using a grating, the option of trading bandwidth for reflectivity also exists. By making the grating short, the bandwidth will be high, but the reflectivity will be low. However, for a square wave response interleaver, high reflectivity is required. Therefore, it is desirable to use a short grating, but one that has a high reflectivity. A low refractive index contrast in the grating is therefore detrimental to the interleaver design.

SUMMARY OF THE INVENTION

In accordance with the present invention, an optical demultiplexing apparatus is provided that separates a plurality of multiplexed optical channels in an input signal. Typically, the multiplexed wavelengths have an equal spacing in frequency. The input signal is directed to an optical interleaver that has a predetermined reflectivity response. That response is essentially a square wave in the frequency domain, such that the interleaver is highly reflective to each of a first set of channels while being highly transmissive to a second set of channels. The first and second channel sets are alternate channels along the wavelength band of the input signal. That is, the channels in the first and second set are interspersed in frequency in an alternating manner to make up the overall plurality of optical channels.

An optical coupler is provided that couples the reflected first set of channels from the interleaver to a first output path. Meanwhile, the transmitted channels of the second set are directed along a second output path. Coarse demultiplexers are used, respectively, to demultiplex the first set of channels and the second set of channels. Because of the separation of the alternate channel sets using the interleaver, the first and second channel sets each have significantly more wavelength spacing between them than in the original input signal. Thus, the demultiplexers are not as susceptible to cross talk as they might otherwise be.

The interleaver may take a number of different forms, for example, a waveguide diffraction grating. A diffraction grating is provided that has the desired reflectivity profile and therefore performs the interleaver function. In one embodiment, the grating is a sampled grating. That is, the grating has a structure with a constant pitch, but periodic breaks in the grating structure. The overall grating, however, produces the desired square wave response. The sampled grating may be apodized, and may be chirped. Indeed, whether or not the grating is a sampled grating, chirping or apodization may be used to improve the response. In another embodiment, the interleaver is a planar waveguide with a section having a periodic fluctuation in the refractive index conditions of the waveguide. For example, the change in refractive index conditions may be produced by a region of the core that is segmented such that sections of the core are replaced by material having a lower index of refraction than the core. Alternatively, a plurality of high refractive index material layers may be distributed in a periodic manner adjacent to a section of the core, such that they evanescently couple to the optical mode. Similarly, the cladding material may have a plurality of gaps distributed in a periodic manner adjacent to a section of the core, such that air or other ambient material borders the core in those gaps.

In the invention, a coupler is used to couple the reflected first set of channel wavelengths to an output path, rather than back to the input. In a first embodiment, the coupler is an optical circulator that conveys the input signal to the interleaver, while also conveying the channels reflected from the interleaver to a first output path. In another embodiment, the coupler makes use of a tilted grating type interleaver that redirects the reflected wavelengths to a first output path, while allowing transmitted wavelengths to be redirected to a second output path. The need for a lens for focusing into the first output path may be eliminated if the grating structure is curved. The curved grating may also function as the interleaver, given the proper system geometry.

DETAILED DESCRIPTION

Figure 1:
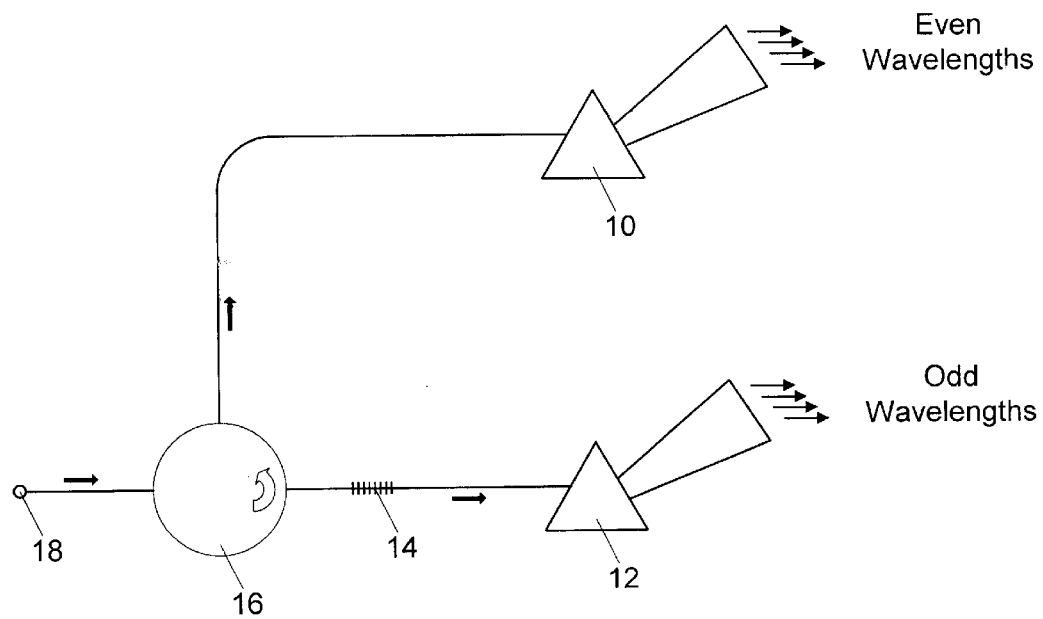
FIG. 1 is a schematic view of an optical demultiplexing apparatus according to the present invention.

Shown in FIG. 1 is a schematic view of a general embodiment of the invention in which two coarse demultiplexers 10, 12 are used in conjunction with an interleaver to demultiplex the channels of an optical system. Each of the demultiplexers handles every other channel, the wavelengths handled by demultiplexer 10 being referred to as the "even" wavelengths, and the wavelengths handled by demultiplexer 12 being referred to as the "odd" wavelengths. Each of the demultiplexers 10, 12 is one of any number of different types of prior art demultiplexers, and easily discriminates between the wavelengths it handles, given the wavelength spacing between them. This is despite the fact that the actual spacing between adjacent channels of the optical system may be too narrow for good discrimination by either demultiplexer acting alone. However, because an interleaver is also used to separate out every other channel, the effective channel spacing is much wider.

In order to perform the desired separation of the odd and even channels, an interleaver 14 is used in conjunction with optical circulator 16. The circulator 16 is a known optical component, and acts as unidirectional optical coupler between different optical paths. Light directed toward the circulator 16 from input port 18 is coupled to the path containing interleaver 14, while light directed toward the circulator 16 from the interleaver 14 is coupled to the path containing demultiplexer 10. Thus, any light from input port 18 that is reflected by the interleaver 14 after exiting the circulator 16 is directed to demultiplexer 10, while portions of the same light signal that are not reflected by interleaver 14 continue on to demultiplexer 12. As such, the function of the interleaver in the embodiment of FIG. 1 is to reflect every other wavelength channel.

The ideal interleaver has a reflectivity profile that is a perfect square wave. In the preferred embodiments of the invention, the interleaver is a fiber grating that is arranged so that sections of maximum reflectivity correspond to the even wavelengths, while the sections of minimum reflectivity correspond to the odd wavelengths. That is, the spacing of the grating is such that the desired square wave profile is produced. For example, in a first embodiment, the grating 14 is made up of a series of gratings, each having a maximum reflectivity at one "even wavelength" and a width corresponding to the bandwidth of the channels of the system. For example, in a forty-channel system, the grating 14 could contain twenty separate gratings, each with a uniform pitch that corresponds to the even wavelengths. The fabrication of such a grating would use essentially the same phase mask lithographic process as would be used for a single wavelength grating, except that it would be used to define all twenty gratings simultaneously. The spacing of the gratings from one another corresponds to the discrimination bandwidth of the demultiplexers 10, 12. In such an arrangement, grating 14 would transmit all the odd channels and reflect all the even channels.

Figure 2:
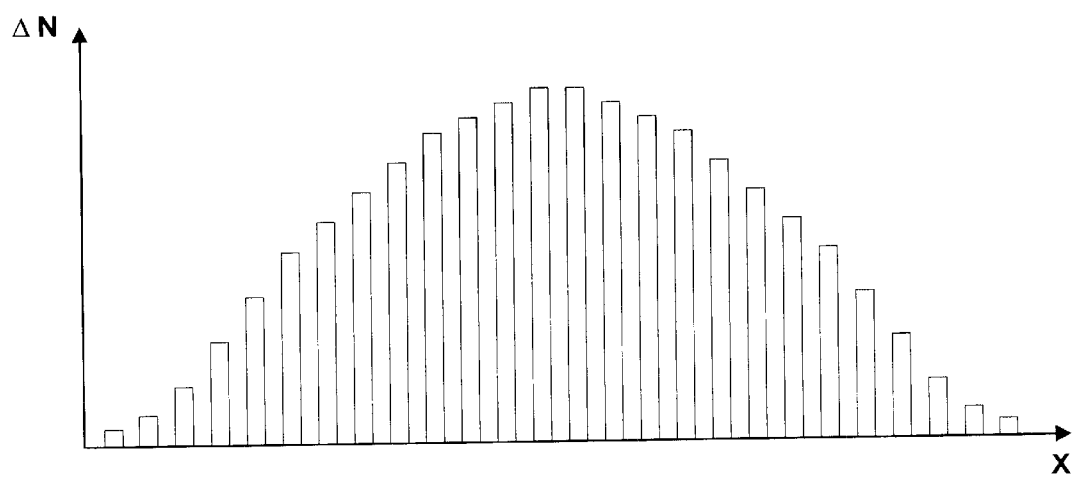
FIG. 2 is a schematic view of a refractive index structure of an apodized diffraction grating that may be used with the present invention.
Figure 2A:
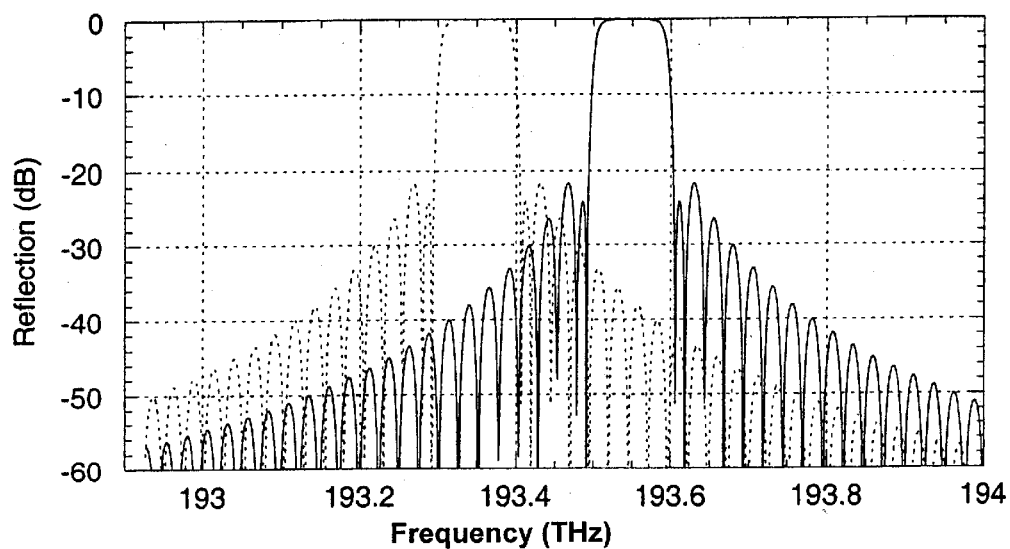
FIG. 2A is a graphical view of a frequency response of an apodized diffraction grating such as that shown in FIG. 2.

It is preferable for the interleaver grating to be apodized, as shown in FIG. 2. This figure shows an example of how the refractive index patterning might change along the length of one grating section, although those skilled in the art will recognize that the profile shown is not to scale. Having the reflective index gradient change in this manner along the length of each grating section reduces the side lobes of the interleaver, and therefore the cross talk between channels. For example, given a grating designed for 100 GHz channel spacings and 200 GHz demultiplexers, appropriate apodizing can reduce the side lobes down close to 30 dB, while the interleaver itself remains flat to 0.1 dB over 0.4 nm. The length of the grating per wavelength channel is 4 mm, and the assumed maximum index change is 0.001. FIG. 2A shows the reflectivity profile of such a grating, shifted by 200 GHz. The apodization eliminates the sidelobes and prevents interference between the gratings. Of course, those skilled in the art will recognize that varying the specific interleaver parameters can allow the performance to be customized.

Figure 3:
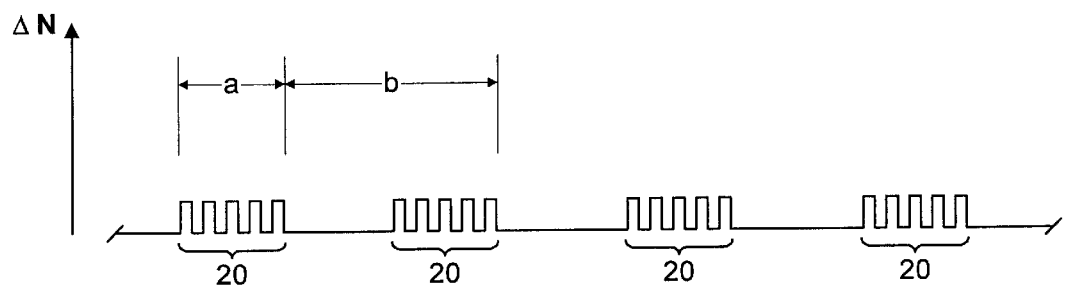
FIG. 3 is a schematic view of the refractive index structure of a sampled grating that may be used with an interleaver according to the present invention.

In another embodiment of the invention, the interleaver grating 14 of FIG. 1 is a "sampled grating" that consists of a grating structure having a constant pitch, but periodic breaks in the grating structure. A portion of such a grating is shown graphically in FIG. 3, although it will be understood that the grating will typically have many more sections 20 than shown. The grating sections 20 are each separated from adjacent sections by an equal amount of space in which there is no grating. The pitch of the grating, the length of the sections 20 and the spacing between them combine to establish the desired reflective properties of the grating. In FIG. 3, the sections 20 are shown as having a length "a" and a separation of "b" between them. The pitch of the grating establishes the center wavelength of the grating, and the periodicity of the sections 20 establishes additional reflectivity peaks away from the center wavelength. The reflectivity peaks created by the sampled grating correspond to the desired channel wavelengths. For any selected center wavelength and grating pitch, a particular set of reflectivity peaks will be created.

Figure 4:
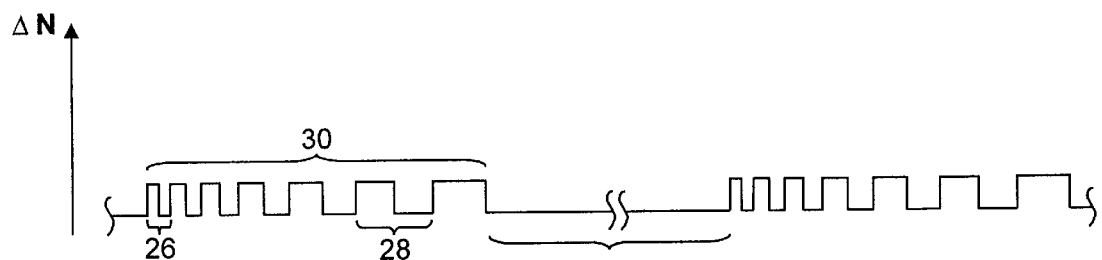
FIG. 4 is a schematic view of the refractive index structure of a chirped sampled grating that may be used with an interleaver according to the present invention.
Figure 5:
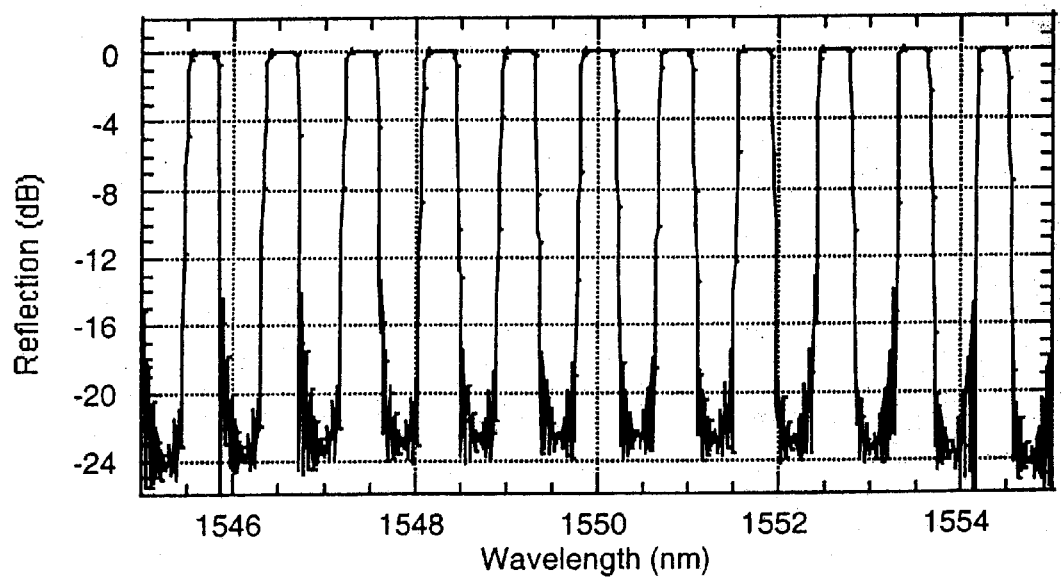
FIG. 5 is a graphical view of a reflectivity profile of a sampled grating that may be used with the present invention.

In a variation of this embodiment, a sampled grating may be used that has a different structure than that shown in FIG. 3. Shown in FIG. 4 is a sampled grating that has a chirped structure, rather than a periodic sequence of grating, sections. As shown, the pitch of the grating increases along the length of each section of the grating structure, starting with a minimum pitch 26 that increases linearly to a maximum pitch 28. The change occurs over a superstructure 30 of predetermined length. An example of the reflectivity provided by a sampled grating like that of FIG. 4 is shown graphically in FIG. 5.

If constructed properly, the chirped grating should provide a larger reflectivity bandwidth and potentially a higher peak reflectivity. Of course, those skilled in the art will recognize that a variety of desired reflectivity profiles may be created by varying the minimum and maximum pitch parameters 26, 28, and the size of the grating superstructure 30. Moreover, while the pitch of the chirped grating sections changes linearly in the embodiment shown, it is not necessary that the change be linear. It is also possible to space the sections apart from one another if desired. Those skilled in the art may vary the grating structure in other ways as well, and such variations are considered to be within the scope of the invention.

Figure 6:
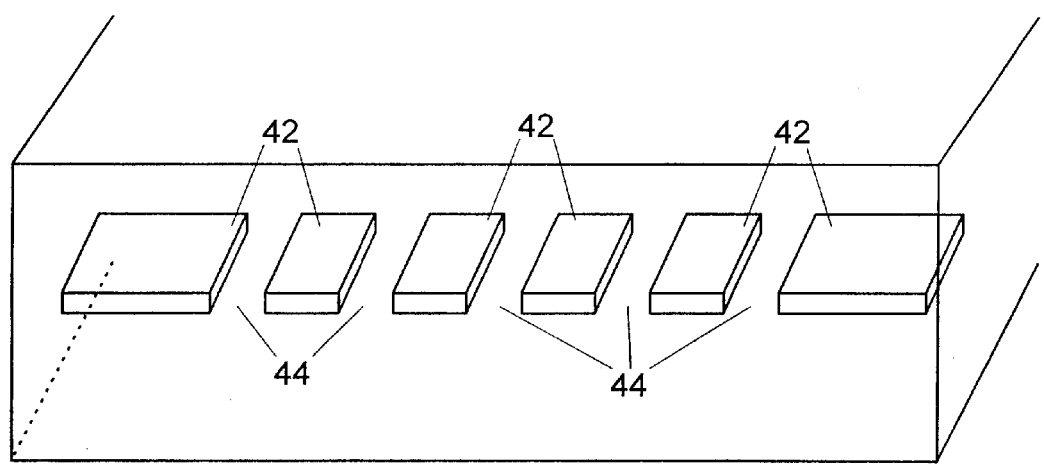
FIG. 6 is a schematic view of a planar waveguide structure that may be used with an interleaver according to the present invention, wherein a portion of the waveguide core is segmented.

In addition to the fiber-based techniques described above, it is possible to create the interleaver 14 of FIG. 1 from a planar waveguide. As in the fiber grating embodiments, it is necessary to get the appropriate changes in refractive index along the waveguide region in order provide the desired reflectivity response. In the embodiment shown in FIG. 6, the interleaver is made up of a cladding region 40 that surrounds a core region 42 through which the optical energy is transmitted. The core region 42 generally has a higher refractive index than the cladding 40, and thereby provides the necessary total internal reflection condition in the core for the wavelength range of interest. Typically, the cladding 40 is a material such as silicon dioxide ($SiO_2$), and the core is a material, such as $SiO_2$ that has a dopant, such as germanium, added to raise its refractive index. This provides the refractive index boundary between the core 42 and the cladding 40. To function as an interleaver, the planar waveguide in FIG. 6 is provided with the desired reflectivity profile by selectively spaced regions of lower refractive index along a lateral section of the core. These regions provide a structure of regular refractive index boundaries that function like a diffraction grating, and which may be configured with the same periods as the fiber gratings described above in order to provide a similar reflectivity profile.

In the embodiment of FIG. 6, the low-refractive index regions 44 along the length of the core may be fabricated in a number of different ways. In the preferred embodiment, the interleaver is fabricated by a phase mask exposure during the fabrication of the core. After deposition of a lower portion of the cladding 40, and the deposition of the core 42 on top of the lower cladding portion, a photoresist material may be applied to the core, and then developed using a phase masking procedure to form the desired core pattern. As is known in the prior art, wet or dry etching may then be used to remove selectively the undesired portions of the core material. Subsequent deposition of the remainder of the cladding layer results in the lower refractive index cladding material settling within the etched regions between portions of the core 42. Those skilled in the art will recognize that FIG. 6 is not to scale, and that typically there would be many more low-refractive index regions 44 to achieve the desired reflectivity profile.

Figure 7:
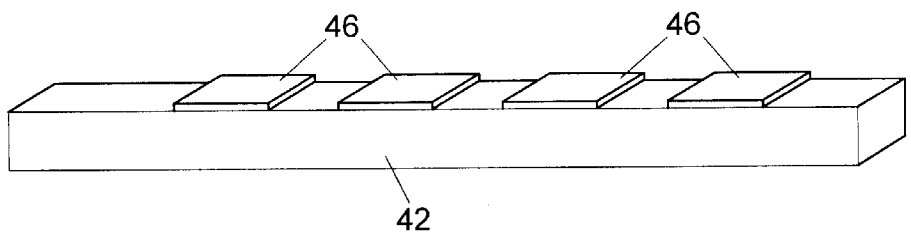
FIG. 7 is a schematic view of a planar waveguide structure that may be used with an interleaver according to the present invention, wherein a portion of the waveguide core has adjacent to it high refractive index loading sections.

In another planar waveguide embodiment, shown in FIG. 7, the desired grating effect is produced by depositing a higher refractive index material at selected locations along the already-deposited core. These "loading" sections 46 create disruptions in the index difference between the core and the cladding, providing a grating-like effect. When placed at equal separations along a section of the core 42, a desired reflectivity profile can be created. Such loading sections can be of any of a number of different high refractive index materials, such as germanium oxide (GeO). Their arrangement would be essentially the same as the arrangement of refractive index interruptions in the core in the foregoing embodiments. However, it is not necessary to etch the core to create the desired reflectivity profile. In FIG. 7, the cladding material surrounding the core 42 is not shown, but those skilled in the art will recognize that such a layer would be provided and would surround both the core 42 and the loading sections 46. Moreover, as in previous figures, FIG. 7 is not to scale, and there are likely to be many more high-index sections 46 to produce the desired reflectivity profile.

Figure 8:
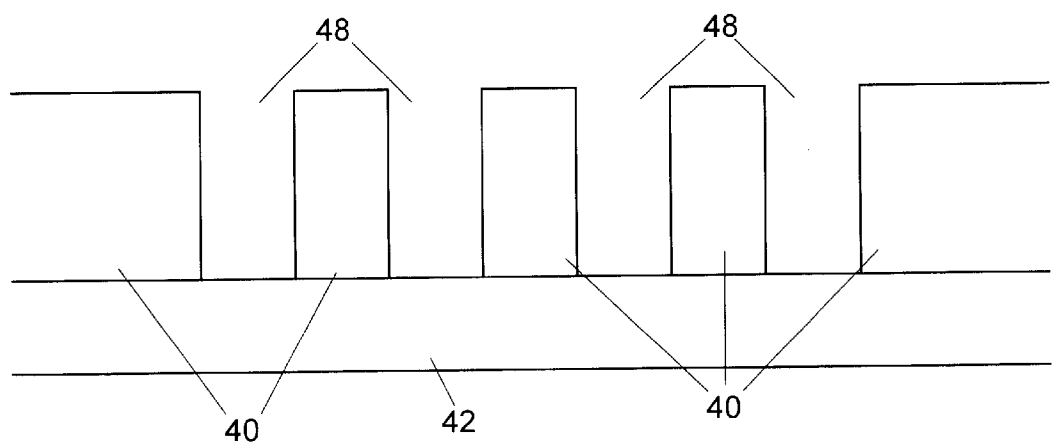
FIG. 8 is a schematic view of a planar waveguide structure that may be used with an interleaver according to the present invention, wherein a portion of the waveguide core has adjacent sections of cladding material etched away to form air gaps.

Yet another planar waveguide embodiment of the interleaver 14 is shown in FIG. 8. A core section 42 is surrounded by cladding material 40. For exemplary purposes, only the cladding material above the core 42 is shown, but it will be understood that the cladding would also be below and on the sides of the core. However, the upper layer of cladding material is etched in selective locations down to the core itself so as to produce air gaps 48 that lie adjacent to the core. These air gaps are periodically situated, and the refractive index difference between the core and the air gaps is higher than the refractive index difference between the core and the cladding material 40. Thus, as in the FIG. 7 embodiment, a grating-like effect is produced that may be used to create a desired reflectivity profile, just as the fiber grating embodiments above. With the appropriate spacing of the air gaps, a square wave profile emerges that may be used for interleaving with the demultiplexer embodiment of FIG. 1. As with the fiber embodiments, an interleaver having a reflectivity profile such as that shown in FIG. 5 may be formed in this manner.

Figure 9:
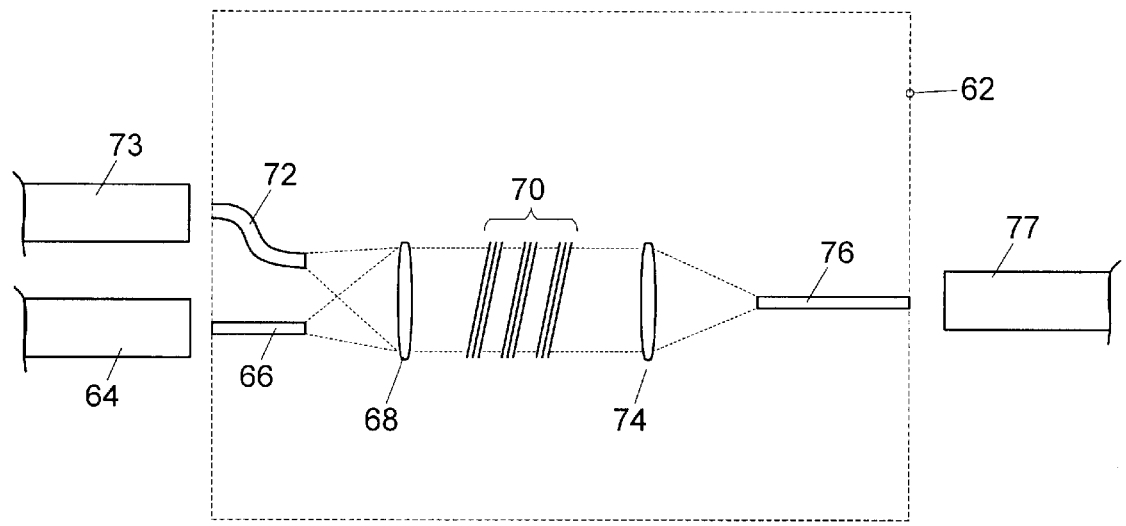
FIG. 9 is a schematic view of a planar waveguide configuration for the invention in which a tilted grating structure is used.

In another variation of the embodiment of FIG. 1, the optical circulator 16 may be omitted by using a diffraction grating in a free-space region. FIG. 9 is a schematic view of such an arrangement. Although this figure uses conventional depictions of discrete optical elements to demonstrate the design, preferably, these components would be fabricated in a planar waveguide material. For example, lenses such as those shown in FIG. 9 may be readily fabricated using regions of high index. Techniques for forming the other components are known in the art. The planar waveguide portion of this embodiment is designated in the figure by broken line 62.

In FIG. 9, an input fiber 64 carries all of the wavelengths to be demultiplexed, and is coupled to an input waveguide 66 in a known manner. The light from the waveguide 66 is coupled to a lens 68, which collimates the beam diverging from the waveguide 66. This collimated beam is directed to an interleaver grating having the characteristics of the gratings discussed above. However, since the grating is slightly tilted with respect to a propagation direction of the beam, the wavelengths that are reflected (e.g., the "even" wavelengths) are redirected by the lens 68 toward a first output waveguide 72. This waveguide is, in turn, coupled to a first external output fiber 73. The wavelengths that are transmitted through the interleaver 70 (i.e., the "odd" wavelengths), are focused by lens 74 into a second output waveguide 76. This waveguide is, in turn, coupled to the external output fiber 77. Those skilled in the art will recognize that there would be many more sections of the grating 70 than are actually shown in the figure.

Figure 9A:
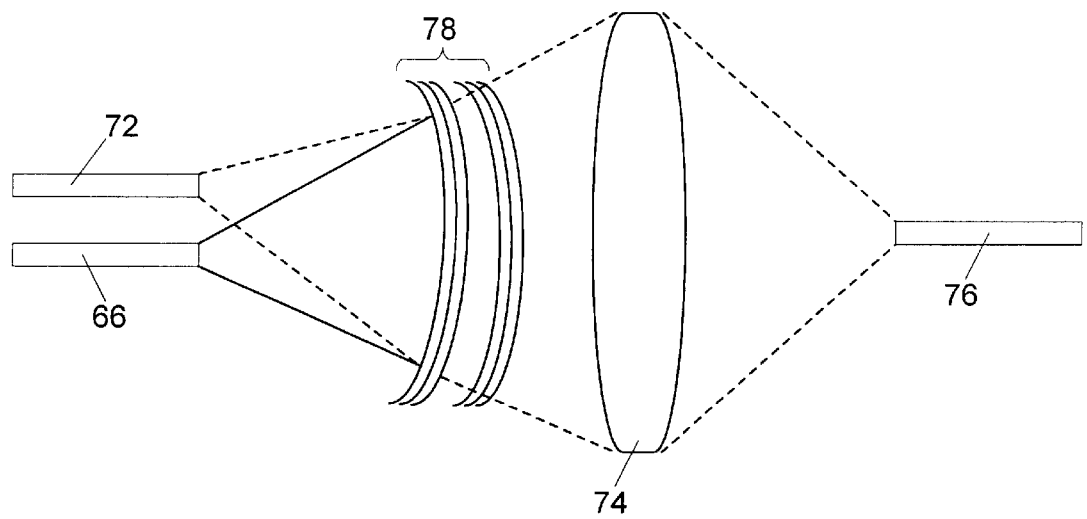
FIG. 9A is a schematic view of an embodiment similar to that of FIG. 9, but in which the tilted grating structure is curved.

In a variation of the FIG. 9 embodiment, the lens 68 can be omitted if the interleaver uses a curved grating structure instead of a flat one. Shown in FIG. 9A is a schematic view of a curved grating 78 that replaces grating 70. The grating, like those described above, is configured to provide the desired interleaver reflectivity profile. That is, the grating has a square wave response that reflects even wavelengths but not odd wavelengths. However, the angle and curvature of the grating 78 are such that the reflected wavelengths are focused into even wavelength waveguide 72. The odd wavelengths are not reflected by the grating 78, and are instead transmitted to lens 74, and thereafter to the odd wavelength waveguide 76. The grating preferably has an overall aspheric shape, and the pitch and spacing of the grating might, for example, be the same as previous embodiments. Again, as in FIG. 9, many more sections of the grating would be present than are actually shown.

While the invention has been shown and described with reference to a preferred embodiment thereof, it will be understood by those skilled in the art that various changes in form and detail may be made herein without departing from the spirit and scope of the invention as defined by the appended claims. For example, the specific structural parameters for the interleavers described herein will vary depending on the particular conditions of the system in question, such as wavelengths, materials, etc. However, given the disclosures herein, those skilled in the art will be able to produce devices having the appropriate characteristics.

What is claimed is:

1. An optical demultiplexing apparatus for separating a plurality of optical channels distributed at an equal wavelength spacing within an input optical signal, the apparatus comprising:

an optical input path along which the input signal is directed;

an optical interleaver to which the input signal is directed from the input path, the optical interleaver having a reflectivity profile that makes it highly reflective to each of a first set of said channels, and highly transmissive to each of a second set of channels, the first channel set and the second channel set being interspersed in wavelength in an alternating manner to make up the overall plurality of optical channels, wherein the interleaver comprises a chirped sampled grating having a plurality of adjacent-grating sections, each with multiple refractive index variations, and wherein the refractive index variations of each section have a pitch that changes along the length of that section;

an optical coupler that couples the first channel set along a first output path;

a second output path along which the second set of channels are transmitted;

a first demultiplexer that demultiplexes the first channel set; and a second demultiplexer that demultiplexes the second channel set.

2. Apparatus according to claim 1 wherein the optical coupler comprises an optical circulator.

3. Apparatus according to claim 1 wherein the optical coupler comprises a curved reflector.

4. Apparatus according to claim 3 wherein the curved reflector receives the input signal from the input path and reflects the first set of channels toward the first output path.

5. An optical demultiplexing apparatus for separating a plurality of optical channels distributed at an equal wavelength spacing within an input optical signal, the apparatus comprising:

an optical input path along which the input signal is directed;

an optical interleaver to which the input signal is directed from the input path, the optical interleaver having a reflectivity profile that makes it highly reflective to each of a first set of said channels, and highly transmissive to each of a second set of channels, the first channel set and the second channel set being interspersed in wavelength in an alternating manner to make up the overall plurality of optical channels, wherein the interleaver comprises a sampled grating having a plurality of adjacent grating sections, each with multiple refractive index variations, and wherein the each section is apodized along the length of that section;

an optical coupler that couples the second channel set along a first output path;

a second output path along which the second set of channels are transmitted;

a first demultiplexer that demultiplexes the first channel set; and a second demultiplexer that demultiplexes the second channel set.

6. An optical interleaver comprising a diffraction grating having a predetermined pitch in a plurality of grating regions, and periodic breaks in the grating structure that separate the grating regions, such that a reflectivity profile is generated that approaches a square wave response relative to wavelength, the grating pitch defining a center wavelength of the response and a period between the grating regions defining a periodicity of said square wave response, wherein the grating pitch in each of the grating sections is chirped such that it varies over the length of that grating section.

7. An optical interleaver according to claim 6 wherein the grating structure is apodized.

8. A method of demultiplexing a plurality of optical channels distributed at an equal wavelength spacing within an input optical signal, the apparatus comprising:

directing the input signal along an optical input path;

coupling the input signal to an optical interleaver having a reflectivity profile that makes it highly reflective to each of a first set of said channels, and highly transmissive to each of a second set of channels, the first channel set and the second channel set being interspersed in wavelength in an alternating manner to make up the overall plurality of optical channels, wherein the interleaver comprises a sampled grating having a plurality of adjacent grating sections, each with multiple refractive index variations, and wherein each section is apodized along the length of that section;

coupling, with an optical coupler, the first channel set along a first output path;

directing the second channel, set along a second output path;

demultiplexing the first channel set with a first demultiplexer; and demultiplexing the second channel set with a second demultiplexer.

9. An optical demultiplexing apparatus for separating a plurality of optical channels distributed at an equal wavelength spacing within an input optical signal, the apparatus comprising:

an optical input path along which the input signal is directed;

an optical interleaver to which the input signal is directed from the input path, the optical interleaver having a reflectivity profile that makes it highly reflective to each of a first set of said channels, and highly transmissive to each of a second set of channels, the first channel set and the second channel set being interspersed in wavelength in an alternating manner to make up the overall plurality of optical channels, wherein the interleaver comprises a planar waveguide;

an optical coupler that couples the second channel set along a first output path;

a second output path along which the second set of channels are transmitted;

a first demultiplexer that demultiplexes the first channel set; and a second demultiplexer that demultiplexes the second channel set.

10. An optical interleaver comprising:

a planar waveguide core having a periodic fluctuation in the refractive index conditions of the waveguide along a longitudinal direction of a section of the core that produces a reflectivity profile with a substantially square wave response in wavelength; and a cladding material surrounding the core, the cladding material having an index of refraction lower than an index of refraction of the core.

11. An optical interleaver according to claim 10 wherein said the periodic fluctuation in the refractive index conditions of the waveguide results at least in part from a segmenting of a portion of the core in a periodic manner.

12. An optical interleaver according to claim 10 wherein the periodic fluctuation in the refractive index conditions of the waveguide results at least in part from a plurality of high refractive index material layers distributed in a periodic manner adjacent to a section of the core.

13. An optical interleaver according to claim 10 wherein the periodic fluctuation in the refractive index conditions of the waveguide results at least in part from a plurality of gaps distributed in a periodic manner in the cladding adjacent to a portion of the core.

14. A method of demultiplexing a plurality of optical channels distributed at an equal wavelength spacing within an input optical signal, the apparatus comprising:

directing the input signal along an optical input path;

coupling the input signal to an optical interleaver having a reflectivity profile that makes it highly reflective to each of a first set of said channels, and highly transmissive to each of a second set of channels, the first channel set and the second channel set being interspersed in wavelength in an alternating manner to make up the overall plurality of optical channels, wherein the interleaver comprises a chirped sampled grating having a plurality of adjacent grating sections, each with multiple refractive index variations, and wherein the refractive index variations of each section have a pitch that changes along the length of that section;

coupling, with an optical coupler, the first channel set along a first output path;

directing the second channel set along a second output path;

demultiplexing the first channel set with a first demultiplexer; and demultiplexing the second channel set with a second demultiplexer.

15. A method according to claim 14 wherein the optical coupler comprises an optical circulator.

16. A method according to claim 14 wherein the optical coupler comprises a curved reflector.

17. A method according to claim 16 wherein the curved reflector receives the input signal from the input path and reflects the first set of channels toward the first output path.

18. A method of demultiplexing a plurality of optical channels distributed at an equal wavelength spacing within an input optical signal, the apparatus comprising:

directing the input signal along an optical input path;

coupling the input signal to an optical interleaver having a reflectivity profile that makes it highly reflective to each of a first set of said channels, and highly transmissive to each of a second set of channels, the first channel set and the second channel set being interspersed in wavelength in an alternating manner to make up the overall plurality of optical channels, wherein the interleaver comprises a planar waveguide;

coupling, with an optical coupler, the first channel set along a first output path;

directing the second channel set along a second output path;

demultiplexing the first channel set with a first demultiplexer; and demultiplexing the second channel set with a second demultiplexer.

19. A method according to claim 18 wherein the planar waveguide has a periodic fluctuation in the refractive index conditions of the waveguide.

20. A method according to claim 19 wherein the periodic fluctuation in the refractive index conditions of the waveguide is produced by sections of a core of the waveguide being replaced with material having a lower index of refraction than the core.

21. A method according to claim 18 wherein the planar waveguide includes a plurality of high refractive index material layers being distributed in a periodic manner adjacent to a core of the waveguide.

22. A method according to claim 18 wherein the planar waveguide includes a plurality of gaps distributed in a periodic manner in a cladding adjacent to a core of the waveguide.

* * * * *

UNITED STATES PATENT AND TRADEMARK OFFICE
CERTIFICATE OF CORRECTION

PATENT NO.    : 6,591,038 B1
DATED         : July 8, 2003
INVENTOR(S)   : Pezeshki It is certified that error appears in the above-identified patent and that said Letters Patent is hereby corrected as shown below:

<u>Column 7,</u>
Line 49, "of adjacent-grating sections" should read -- of adjacent grating sections --

Signed and Sealed this

Second Day of March, 2004

JON W. DUDAS
*Acting Director of the United States Patent and Trademark Office*